United States Patent
McGushion

(10) Patent No.: US 7,520,538 B2
(45) Date of Patent: Apr. 21, 2009

(54) ORBITAL TUBE WELDING PURGE ADAPTOR

(76) Inventor: Kevin David McGushion, 1448 19th St., Santa Monica, CA (US) 90404

( * ) Notice: Subject to any disclaimer, the term of this patent is extended or adjusted under 35 U.S.C. 154(b) by 491 days.

(21) Appl. No.: 11/036,089

(22) Filed: Jan. 14, 2005

(65) Prior Publication Data

US 2006/0157535 A1   Jul. 20, 2006

(51) Int. Cl.
F16L 37/18 (2006.01)
(52) U.S. Cl. .................... 285/312; 285/346; 285/121.1; 228/4.5; 228/214; 228/48; 228/103; 228/42; 219/125.11; 219/74; 219/61; 219/160; 219/161; 219/158; 279/2.17; 279/2.18; 269/86; 269/87; 269/89; 269/93; 269/95; 269/97; 269/184; 215/289; 215/274; 277/434; 277/472; 277/382; 277/459; 411/433; 251/149.6
(58) Field of Classification Search ............ 137/1; 228/219, 214, 48, 103, 42, 4.5; 219/125.11, 219/74, 61, 160, 161, 158; 285/346, 312, 285/121.1; 279/2.17, 2.18; 74/89.34; 269/86, 269/87, 89, 93, 95, 97, 184; 215/289, 274; 277/472, 382, 459, 434; 411/433; 251/149.6
See application file for complete search history.

(56) References Cited

U.S. PATENT DOCUMENTS

| | | | |
|---|---|---|---|
| 3,724,273 A | 4/1973 | Awrey | |
| 3,868,132 A * | 2/1975 | Racine | ........................ 285/312 |
| 4,723,064 A | 2/1988 | Bothe | |
| 5,209,527 A * | 5/1993 | Hohmann et al. | ............ 285/242 |
| 5,396,039 A | 3/1995 | Chevrel | |
| 5,425,492 A | 6/1995 | Thode | |
| 5,484,973 A | 1/1996 | Gittens | |
| 5,669,547 A | 9/1997 | Spring | |
| 5,722,556 A * | 3/1998 | Ota et al. | .................. 220/367.1 |
| 5,779,089 A * | 7/1998 | West | ........................ 220/367.1 |
| 6,276,545 B1 * | 8/2001 | Ferrari | ........................ 215/293 |
| 6,752,218 B2 * | 6/2004 | MacDonald et al. | ........... 169/43 |
| 2002/0046772 A1 * | 4/2002 | Blom | .......................... 137/231 |
| 2005/0167976 A1 * | 8/2005 | Le Quere et al. | ............... 285/39 |
| 2005/0265869 A1 * | 12/2005 | Blom | .......................... 417/441 |
| 2008/0173351 A1 * | 7/2008 | van der Blom | .................. 137/1 |

FOREIGN PATENT DOCUMENTS

JP       2004295119 A   * 10/2004

* cited by examiner

*Primary Examiner*—Kiley Stoner
*Assistant Examiner*—Erin B Saad
(74) *Attorney, Agent, or Firm*—Aaron P. McGushion

(57) ABSTRACT

A purge gas introduction system for an orbital tube welding setup is provided, configured to inject high purity inert purge gas to the interior volume of a tube or tubular component. An o-ring is interposed between an annular base and an annular ring, their junction forming an annular o-ring groove, each part forming one sidewall, with the o-ring fully recessed within the groove, protecting the o-ring during the insertion and removal of a tube. The annular base and an annular ring are configured to receive a tube terminus. The sidewalls of the o-ring groove are divergent one to the other, wherein as the annular ring is drawn towards the annular base, the o-ring is forced partially out of the groove, forming a substantially leak tight seal between the tube and the o-ring. A purge gas from an external source is transmitted to the annular base through a purge connector, then, in turn, introduced to the interior volume of the tube.

7 Claims, 5 Drawing Sheets

ORBITAL TUBE WELDING PURGE ADAPTOR

BACKGROUND—FIELD OF INVENTION

This invention relates generally to the welding of tubular components utilizing an orbital tube welding device. More particularly, this invention relates to a method of introducing inert purge gas to the interior of a tubular component, for the purpose of providing an inert welding atmosphere, resulting in high purity welds.

BACKGROUND—DESCRIPTION OF PRIOR ART

When orbital arc welding in abutment two tubes, or tubular components, it is necessary to provide an inert purge gas flow to both the exterior and interior of the tubes. This purge flow displaces the atmospheric gases surrounding the weld area, preventing the adverse metallurgical and contaminating effects due to reactive gases, such as oxygen. The exterior purge is often effectively provided by an orbital welding device or a fixture device. However, no effective, repeatable, and feasible means for providing an interior tube purge has been heretofore devised.

A common practice in the industry is to use compression fittings to seal the purge hose to the tubular components being welded. The purge hose transmits an inert purge gas from a purge source to the weld area. The purge hose is approximately 0.25 to 1.00 inches in diameter, depending on the diameter of the tube to be purged. In order to effectively connect the purge hose to the tubular component, especially when they are of dissimilar diameters, it is often necessary to use multiple compression fittings to complete the transition. The practitioner can spend a significant amount of time searching for the appropriate series of compression fitting parts for each welding setup. Using compression fittings for purging can be costly in parts and labor. Additionally, compression become less feasible as the diameter of the tubular component is increased.

When welding larger diameter tubes, it is common to seal the purge hose to the tube using tape. Many variations of this method are used to attempt a leak tight seal between the purge hose and the tube, as many as can be imagined. For instance, a hole can be cut through a flexible plastic end cap. The end cap is placed over the tube, at the point of purge introduction. The purge hose is inserted into the hole, and taped in place. In another case, tape is applied across the open end of the tube, and the purge hose is placed in a hole formed through the tape dam. Further taping is required to hold the purge hose in place.

For several reasons, this method of attachment is not desired. First, if a substantially leak tight seal has not been created, atmospheric gas can be siphoned in with the flow of purge gas, introducing impurities to the weld site, and possibly causing weld failure. Additionally, the adhesive on the tape can introduce volatile compounds and other impurities into the purge stream, again possibly degrading the quality of the completed weld. Furthermore, the assembly is likely to have inconsistent stability and tensile strength. If the purge hose or tube assembly is bumped or jarred, the tube could be easily torn loose from the tape dam.

The purge system disclosed in U.S. Pat. No. 4,723,064 to Both II (1988) provides a plate gasket sealed against the open end of the tubular component. An externally threaded tube passes through the gasket plate, delivering purge gas to the interior of the tube and providing a mechanical connection from a thumbscrew to an expanding mechanism located inside the tube. As the thumbscrew is rotated, the expanding mechanism is forced out and in contact with the interior wall of the tube. The thumbscrew is tightened further, forcing the expanding mechanism to press firmly against the interior wall, also causing the gasket plate to be drawn closer to the open end of the pipe.

Although preferable to some of the aforementioned techniques, the plate gasket mechanism has several drawbacks. The expanding mechanism pushing outwardly against the interior wall of the tube, followed by the shear force as the plate gasket is drawn towards the open end of the pipe, can cause gouging on the interior wall. The resulting gouge can entrap impurities and cause turbulent flow in the surrounding regions. Additionally, the expansion force of the mechanism can deform thin-walled tubing, causing an oblong cross section. The sealing integrity relies on the flatness of the tube. If the tube end is either not flat with respect to the gasket plate or has a burr, the seal can be compromised or the gasket damaged. Finally, the action of rotating the externally threaded tube within the tubular component can deposit oil and fine particles of metal inside.

Yet another existing solution is a torsional o-ring compression fitting. The o-ring is located inside of a hollow cylindrical tube on an internal annular shelf; the outer diameter is threaded at the tip. A ring threadably engages the cylindrical tube, compressing the o-ring. A tube is inserted into the assembly, contacting the o-ring while being inserted; and the ring is rotated to further compress the o-ring, sealing it against the tubular component.

There are several disadvantages to the torsional o-ring compression fitting. The primary disadvantage is that the tubular component contacts the o-ring while being inserted or removed from the fitting. This contact imparts a shear and frictional force on the o-ring, damaging the o-ring sealing surface and degrading the structural integrity. Over a relatively short time, the o-ring can be damaged, causing sealing failure. Additionally, the torsional compressive effect of rotating the threaded ring imparts an additional shear stress on the o-ring, again reducing the life cycle.

As can be seen by existing solution attempts, the problem of providing high purity purge gas flow to the interior of a tubular component has not been fully addressed. Existing methods can introduce impurities into the tubular components, provide an unstable connecting means, or even damage the tubular components.

What is needed is a device that can provide high purity inert purge gas to the interior of a tubular component assembly being welded, without the introduction of impurities. What is also needed is a device that can connect a purge hose to a tubular component with substantially dissimilar diameters. What is further needed is a device that provides a stable connection between the purge hose and the tubular component assembly. What is again further needed is a device that does not damage the tubular component. What is additionally needed is a device that is easy to operate, and engages and disengages quickly.

OBJECTS OF THE INVENTION

It is a general object of the present invention to provide a purge device that can deliver a high purity inert gas flow to the interior volume of a tubular component assembly being welded, without introducing impurities.

It is another object of the present invention to provide a purge device that does not damage the o-ring.

It is yet another object of the present invention to provide a purge device to connect a purge hose to a tubular component, regardless of diameter dissimilarities.

It is a further object of the present invention to provide a purge device to connect a purge hose to a tubular component in a stable configuration.

It is yet a further object of the present invention to provide a purge device that is easy to operate, both in engagement and in disengagement.

Other objects and features of advantage will become apparent as the specification progresses and from the claims.

SUMMARY OF THE INVENTION

In accordance with the present invention, a purge injection system is provided for use in orbital welding tubular components. The purge injection system can deliver high purity purge gas to the interior of a tubular component assembly, without introducing impurities, preparing the assembly for orbital welding. The purge injection system provides critical protection to the o-ring, preventing abrading damage from the tube insertion. The purge injection system provides a robust connection between the purge hose and tube, even when they are of dissimilar diameters. The purge injection system additionally provides a rapid and simple method to connect a purge source to tubular components being welded, increasing production.

The preferred embodiment of the present invention is generally comprised of a tube engagement base, a tube engagement ring, an o-ring, a compression lever assembly, and a purge connector, forming a purge adaptor assembly.

The tube engagement base is generally cylindrical with a chamber formed within. One end of the tube engagement base is blanked off, while the opposite end is open, with sufficient clearance to receive the terminus of a tubular component. An annular shelf is formed inside the chamber to provide a tube locator for the terminus of the tubular component. On the open end of the tube engagement base, an outer annular shelf is formed on the outer diameter; a short tubular extension is formed as a result.

The tube engagement ring is generally cylindrical in shape; a hole is formed through with a diameter substantially similar to the tube locator diameter of the tube engagement base. An inner annular shelf is formed in the inner diameter of the tube engagement ring. The inner annular shelf receives the tubular extension of the tube engagement base, forming an o-ring groove there between. The external geometry of the tube engagement base and tube engagement ring are not restricted to a cylindrical geometry, any shape that does not interfere with operation is acceptable.

The o-ring is interposed between the tube engagement base and the tube engagement ring in the o-ring groove, contacting the tubular extension end and the inner annular shelf bottom. The surfaces of the tubular extension end and the inner annular shelf bottom, forming the two sidewalls of the o-ring groove, are generally not parallel one to the other; they are preferably, diverging as they approach the central axis of the hole formed through the tube engagement ring. The planar angle of divergence is approximately 10 degrees. Alternate planar angles of divergence may also be used. As the tube engagement base approaches the tube engagement ring, the two diverging sidewalls approach one another, squeezing the o-ring out of the o-ring groove.

The compression lever assembly mechanically couples the tube engagement ring to the tube engagement base. The compression lever assembly is generally comprised of two couplers, two levers, and a handle. A coupler and lever configuration is generally mirrored on opposing sides of the tube engagement ring and the tube engagement base. The lever is generally L shaped, with a pivot located at the bottom tip of the L and a pivot located at the bottom corner of the L. The pivot at the bottom tip connects the lever to the tube engagement base. The pivot at the bottom corner connects the lever to the coupler. The coupler has a pivot point at each end, with one pivot being connected to the tube engagement ring and the opposite pivot being connected to the lever pivot at the bottom corner. A handle extends between the coupler and lever assemblies located on opposing sides. Any number of coupling mechanisms can be used to connect and bring together the tube engagement base to the tube engagement ring, such as a manual lever, an actuated system, or any similar mechanism.

The purge connector extends from the tube engagement base. A fluid passage formed through the purge connector and the wall of the tube engagement base transmits purge gas from the purge hose to the interior of the tube engagement base. A purge hose can be connected to the purge connector by either slipping the flexible hose over the outer diameter of the purge connector or by using a fitting, such as a simple compression fitting.

The location of the purge connector on the tube engagement base affects the flow characteristics of the purge gas as it enters the tubular component. For instance, if the direction of the purge flow entering the tube engagement base is generally parallel to the central axis of the tubular component, then the gas flow will be substantially laminar. If the direction of the purge flow entering the tube engagement base is generally perpendicular to the central axis of the tubular component, then the gas flow will be substantially turbulent. Turbulent flow is generally preferred; as turbulent purge flow tends to sweep out impurities from the interior of the tubular component more effectively than laminar flow.

A tubular component is inserted into the purge adaptor assembly, through the tube engagement ring and into the tube engagement base, stopping at the tube locator. When the tubular component is being inserted, the compression lever assembly is in the open position, wherein the couplers apply no compressive force on the tube engagement ring, and the o-ring is completely recessed in the o-ring groove, not contacting the tubular component. The tubular component slides into position without resistance when the compression lever assembly is in the open position.

The recessed position of the o-ring is critical to the consistent and effective operation of the purge injection system. If the o-ring were not recessed when the tubular component is inserted, the o-ring can be damaged due to shear and frictional forces of the tubular component contacting the o-ring. The life cycle of the o-ring is greatly reduced due to this wear. The recessed position of the o-ring of the present invention eliminates damage due to contact with the tubular component as it is inserted and removed, increasing the life cycle of the o-ring and improving sealing integrity.

After the tubular component has been inserted into the purge adaptor assembly, the compression lever assembly is manually placed in the closed position. In the closed position, the tube engagement ring is drawn towards the tube engagement base by the coupler. Consequently, the surfaces of the tubular extension end and the inner annular shelf bottom are also drawn together; their divergent surfaces squeeze the o-ring towards the surface of the tubular component. The o-ring creates a seal between the purge adaptor and the tubular component, additionally holding the tubular component firmly in place. The seal created eliminates the introduction of impurities during the purge process. The present invention's securing and sealing mechanisms not only seal effectively, they do so without damaging the tubular component.

Although one mechanism to draw the tube engagement ring towards the tube engagement base has been demonstrated, it is understood that various mechanisms can be used to achieve similar results.

When the tubular component is locked in place, a purge gas from a compressed source is transmitted through the purge hose, into the purge connector, and delivered to the interior of the tube engagement base. The purge gas is then directed to the interior volume of the tubular component. After a predetermined purge time, the atmosphere in the internal volume near the weld site is replaced with the purge gas. The purge gas exhausts from the tubular component assembly downstream of the weld area, possibly through a flow restrictor or flow control device.

After the tubular component has been welded to a second tubular component, the tubular component can be removed from the purge adaptor assembly by simply returning the compression lever assembly to the open position. The surfaces of the tubular extension end and the inner annular shelf bottom are pushed apart, allowing the o-ring to recess back into the o-ring groove and recede from contacting the tubular component surface. The tubular component can then be easily slipped out of the purge adaptor assembly. A new tubular component can be immediately installed for the following weld.

For tubular components of any diameter, a purge adaptor assembly can be manufactured to create a substantially leak tight seal between the purge adaptor assembly and the tubular component. The diameters of the tube engagement base, tube engagement ring, and o-ring are modified to effectively receive the tubular component and create a seal.

An alternate embodiment of the present invention would allow the purge adaptor assembly to be interposed between two tubular components, each tubular component being inserted into matching chambers at opposing ends of the purge adaptor assembly. Each end of the purge adaptor assembly, in a manner similar to the preferred embodiment, has a tube engagement ring, an o-ring, and a tube stop. However, there is a hole formed through the tube engagement base, allowing fluid communication between the two tubular components in a leak tight manner. A lever mechanism can be used to simultaneously draw both tube engagement rings towards the tube engagement base. A pressure port, or optionally a purge connector, can be installed in the tube engagement base.

This alternate embodiment is useful for determining the localized pressure at a planned weld seam before the weld. The alternate purge adaptor assembly can be placed between two tubular components before the weld, and a prescribed flow of purge gas introduced into the interior volume, possibly using the preferred embodiment on the opposite end of the tubular component. The local pressure at the alternate purge adaptor assembly is measured. The alternate purge adaptor assembly is then removed; and the tubular components are prepared for welding. The local pressure sensed at the alternate purge adaptor assembly can be maintained throughout the weld.

All of the disadvantages of the prior art have been addressed by the present invention. The present invention facilitates the introduction of inert purge gas to the interior of tubular components, without the introduction of volatile impurities. The present invention primarily protects the integrity of the o-ring, recessing it within the o-ring groove. The present invention provides a method of securely connecting, in a sealed configuration, a purge hose to a tubular component of dissimilar diameters. The present invention additionally provides a method to connect a purge hose to a tubular component, in a stable and secure manner, preventing accidental disengagements. Further, the present invention provides a mechanism for securing a purge hose to a tubular component without damaging the tubular component or the o-ring. Additionally, the present invention is easy to use, and can quickly be engaged and disengaged, or even switched to another tubular component without wasted time.

DESCRIPTION OF THE PREFERRED EMBODIMENTS

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1A:
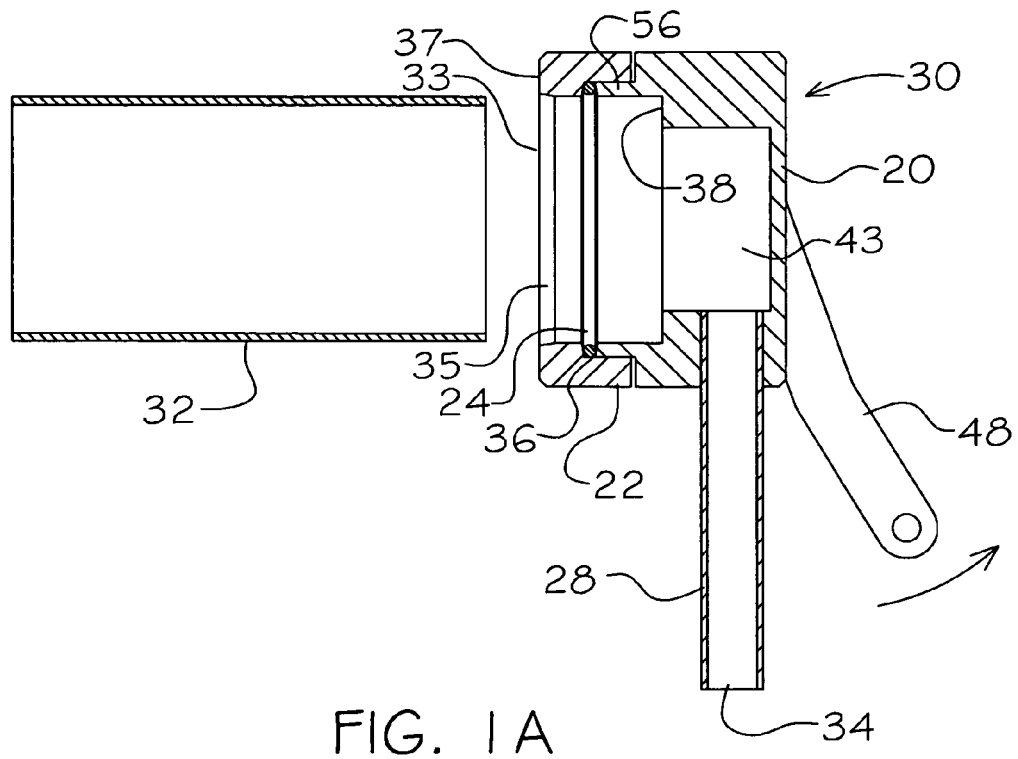
FIG. 1A is a cross-sectional side view of the present invention in the open position and the tubular component not inserted.
Figure 1B:
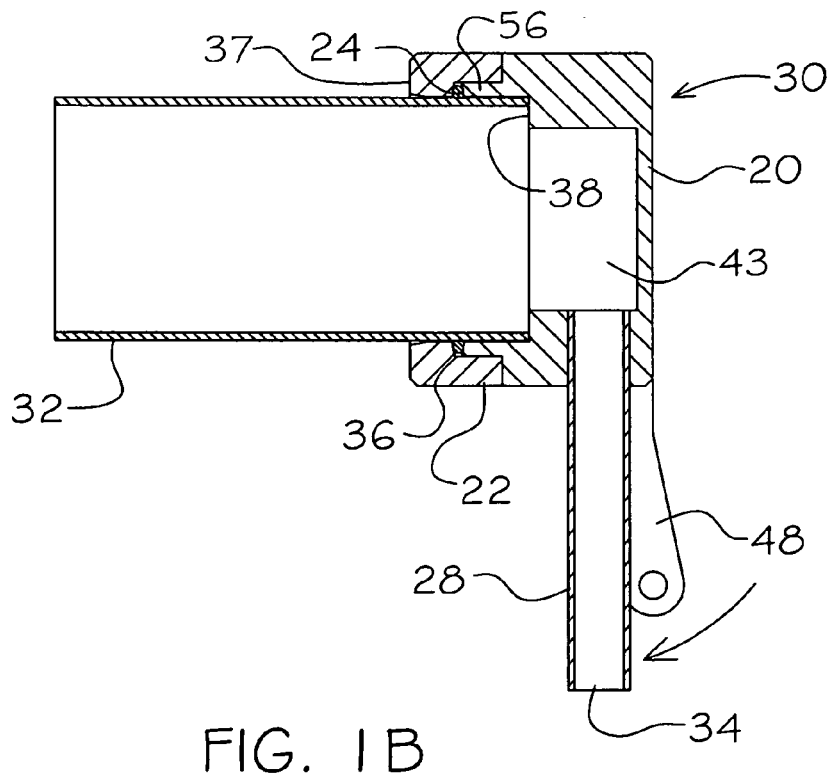
FIG. 1B is a cross-sectional side view of the present invention in the closed position and the tubular component inserted.
Figure 2A:
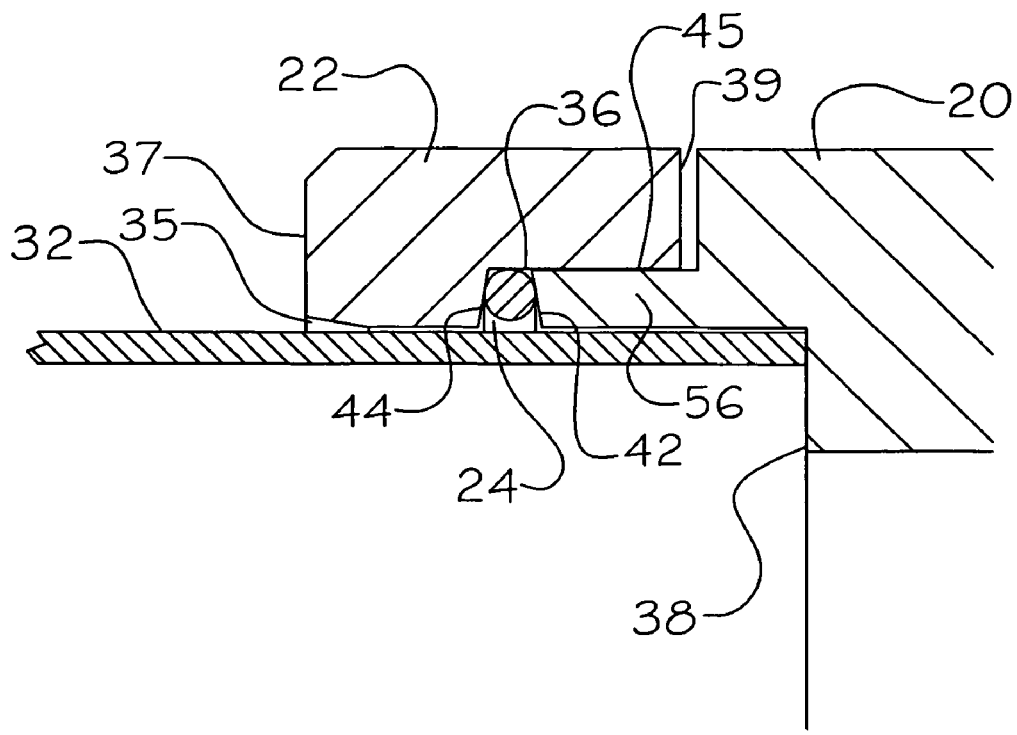
FIG. 2A is a cross-sectional magnified view of the present invention showing the o-ring area in the open position and the tubular component inserted.

As can be seen in FIGS. 1A-B and 2A, the purge adaptor assembly (30) receives a tubular component (32) through the tube orifice (or receptacle) (33). The tube engagement ring (22) is generally cylindrical in geometry, with a tube orifice (33) formed through. A chamfer (35) is formed at the front face (37) of the tube engagement ring (22) to guide the tubular component (32) into the tube orifice (33). An inner annular shelf (45) is formed from the back face (39) of the tube engagement ring (22). The plane of the inner annular shelf bottom (44) being substantially nonparallel to the front face (37), generally sloping towards the front face (37) as the inner annular shelf bottom (44) approaches the central axis of the tube orifice (33).

The tube engagement base (or breech) (20) is generally cylindrical in geometry, the outer diameter being substantially similar to the outer diameter of the tube engagement ring (22). However, it is not necessary for the diameters of the tube engagement base (20) and the tube engagement ring (22) to be the same. A chamber (43) is formed in the tube engagement base (20), formed parallel with the central axis, being open on one end. A counterbore is formed from the open end of the tube engagement base (20), creating a tube locator shelf (38). On the open end of the tube engagement base (20), an outer annular shelf is formed on the outer diameter; a short tubular extension (defined therein a bore) (56) is resultant. The inner annular shelf (45) of the tube engagement ring (22) receives the tubular extension (56) of the tube engagement base (20). The tubular extension end (42) and the inner annular shelf bottom (44) together create the 0-ring groove (36) when the tube engagement ring (22) in inserted into the tube engagement base (20). The plane of the tubular extension end (42) is divergent to the plane of the inner annular shelf bottom (44), sloping away one from another approaching the central axis.

Again, referring to FIG. 1A, a purge connector (28) extends from the tube engagement base (20), fluidly communicating a purge gas from an external source to the chamber (43). A compression fitting can be attached to the purge connector (28), or a flexible purge hose can be slid over the outer diameter, to communicate a purge gas from a source.

The o-ring (24) lies in the o-ring groove (36). The o-ring (24) is recessed within the o-ring groove (36) when the lever (48) is placed in the open position, as illustrated in FIG. 1A. When the lever (48) is placed in the closed position, as seen in FIG. 1B, the o-ring (24) is forced partially out of the recess of the o-ring groove (36), contacting and sealing against the outer diameter of the tubular component (32).

As can be seen in the magnified view in FIG. 2A, the tubular component (32) is inserted into the purge adaptor assembly (30) through the tube orifice (33), while in the open position. The o-ring (24) is completely recessed within the o-ring groove (36). The tubular component (32) is inserted into the orifice (33) of the purge adaptor assembly (30) without contacting the o-ring (24). The terminus of the tubular component (32) contacts the tube locator shelf (38). The tubular extension end (42) and the annular shelf bottom (44) exert relatively little or no compressive force on the o-ring (24).

Figure 2B:
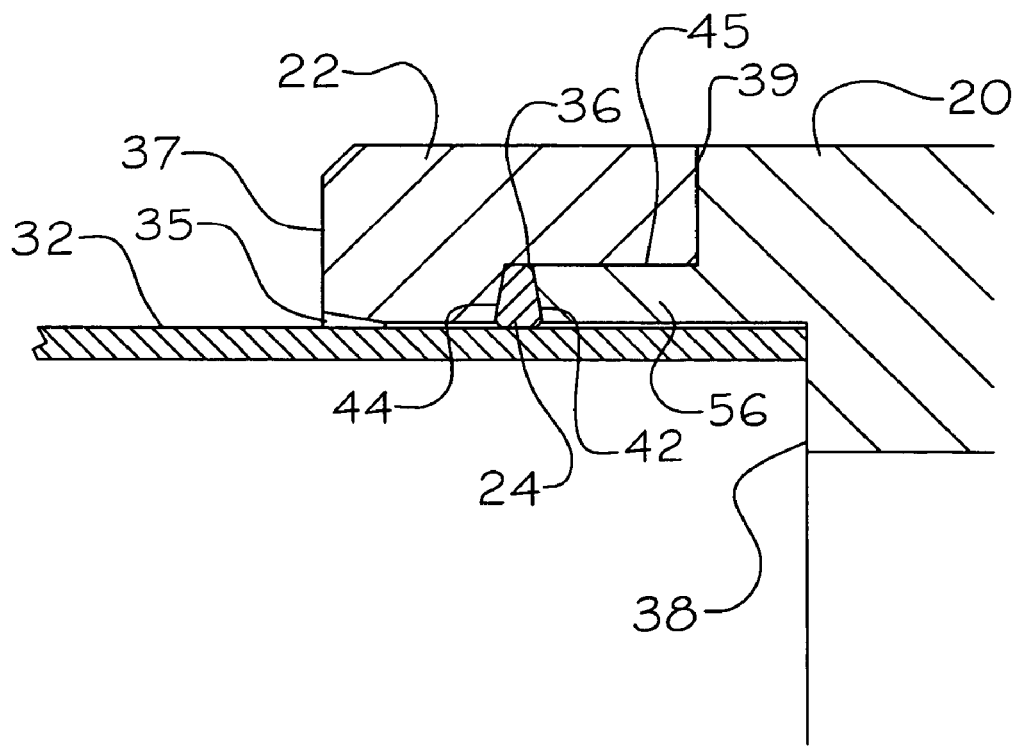
FIG. 2B is a cross-sectional magnified view of the present invention showing the o-ring area in the closed position, sealed against the tubular component.

Viewing FIG. 2B, the tubular component (32) is positioned in the purge adaptor assembly (30), while in the closed position. When transitioning from the open position to the closed position, the tube engagement ring (22) is drawn towards the tube engagement base (20) by the compression lever assembly (52), more completely illustrated in FIGS. 3A-B. The faces of the tubular extension end (42) and the annular shelf bottom (44) are also drawn together, exerting a compressive force on the o-ring (24). Due to the diverging planes of the tubular extension end (42) and the annular shelf bottom (44), the compressing action forces the o-ring (24) out of the o-ring groove (36), compressing the o-ring (24) against the outer surface of the tubular extension (32). This action creates a seal between the o-ring (24) of the purge adaptor assembly (30), allowing the introduction of high purity purge gas, while minimizing external contamination. After the weld is completed, the tubular component (32) can be removed from the purge adaptor assembly (30) by simply returning the lever (48) back to the open position and removing the tubular component (32).

Figure 3A:
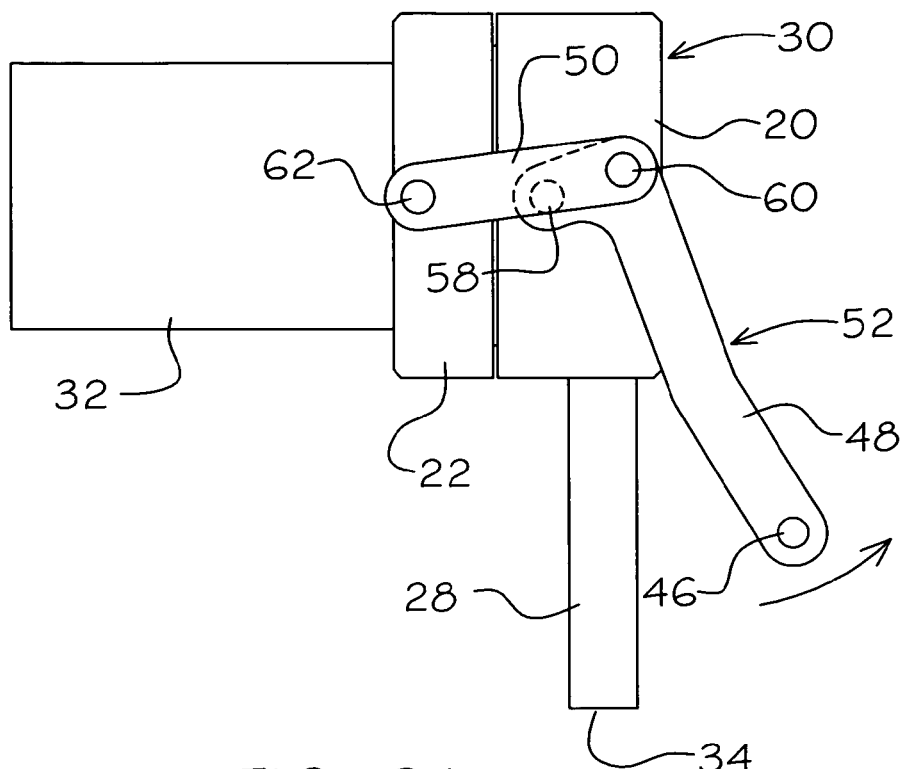
FIG. 3A is a side view of the present invention in the open position.

Looking again at FIG. 3A, a tubular component (32) is inserted into the purge adaptor assembly (30), while the compression lever assembly (52) is in the open position. Although various mechanisms may be used to draw the tube engagement ring (22) towards the tube engagement base (20), a preferred mechanism is illustrated. The compression lever assembly (52) is generally comprised of two couplers (50), two levers (48), and a handle (46). The configuration of the couplers (50) and the levers (48) are generally mirrored on opposing sides of the tube engagement ring (22) and the tube engagement base (20), with one lever (48 and one coupler (50) on each side. The lever (48) is generally L shaped, with a lever pivot (58) located at the bottom tip of the L and a common pivot (60) located at the bottom corner of the L. The coupler (50) has a coupler pivot (62) on one end and a common pivot (60) on the opposite end. The lever pivot (58) connects the lever (48) to the tube engagement base (20). The common pivot (60) connects the lever (48) to the coupler (50). The coupler pivot (62) connects the coupler (50) to the tube engagement ring (22). When the compression lever assembly (52) is pulled upward, as indicated by the arrow, the lever (48) pushes on the coupler (50); in turn, the coupler (50) forces the tube engagement ring (22) away from the tube engagement base (20), allowing the o-ring (24) to recess within the o-ring groove (36).

Figure 3B:
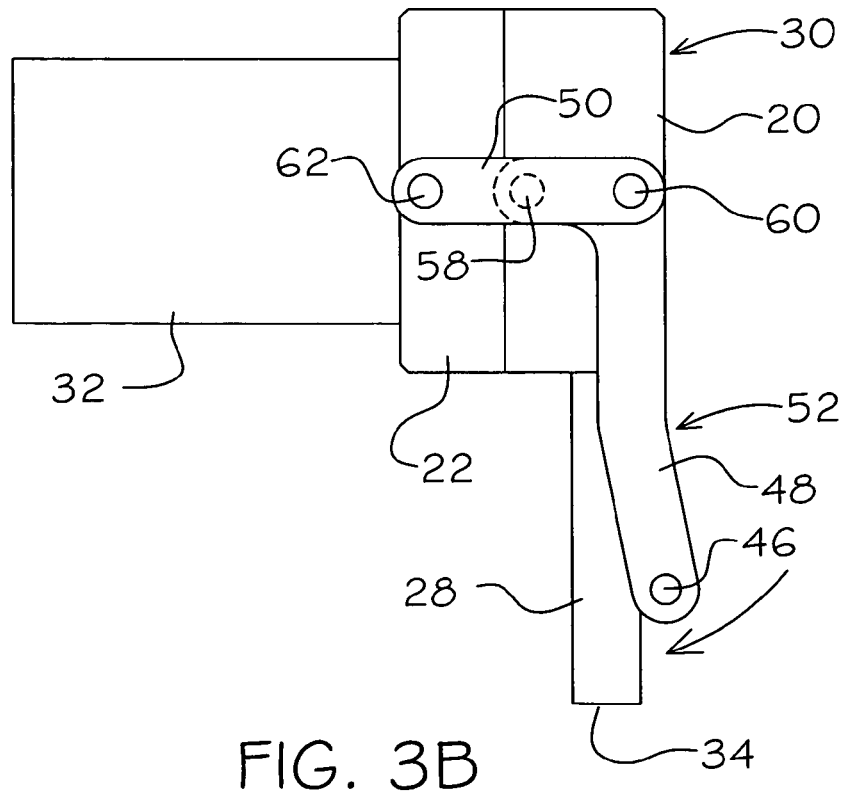
FIG. 3B is a side view of the present invention in the closed position.

Referring to FIG. 3B, a tubular component (32) is positioned within the purge adaptor assembly (30), while the compression lever assembly (52) is in the closed position. When the compression lever assembly (52) is pulled downward, as indicated by the arrow, the lever (48) pulls on the coupler (50); in turn, the coupler (50) pulls the tube engagement ring (22) towards the tube engagement base (20), forcing the o-ring (24) to expand beyond the o-ring groove (36), sealing the o-ring (24) against the outer surface of the tubular component (32).

Figure 4:
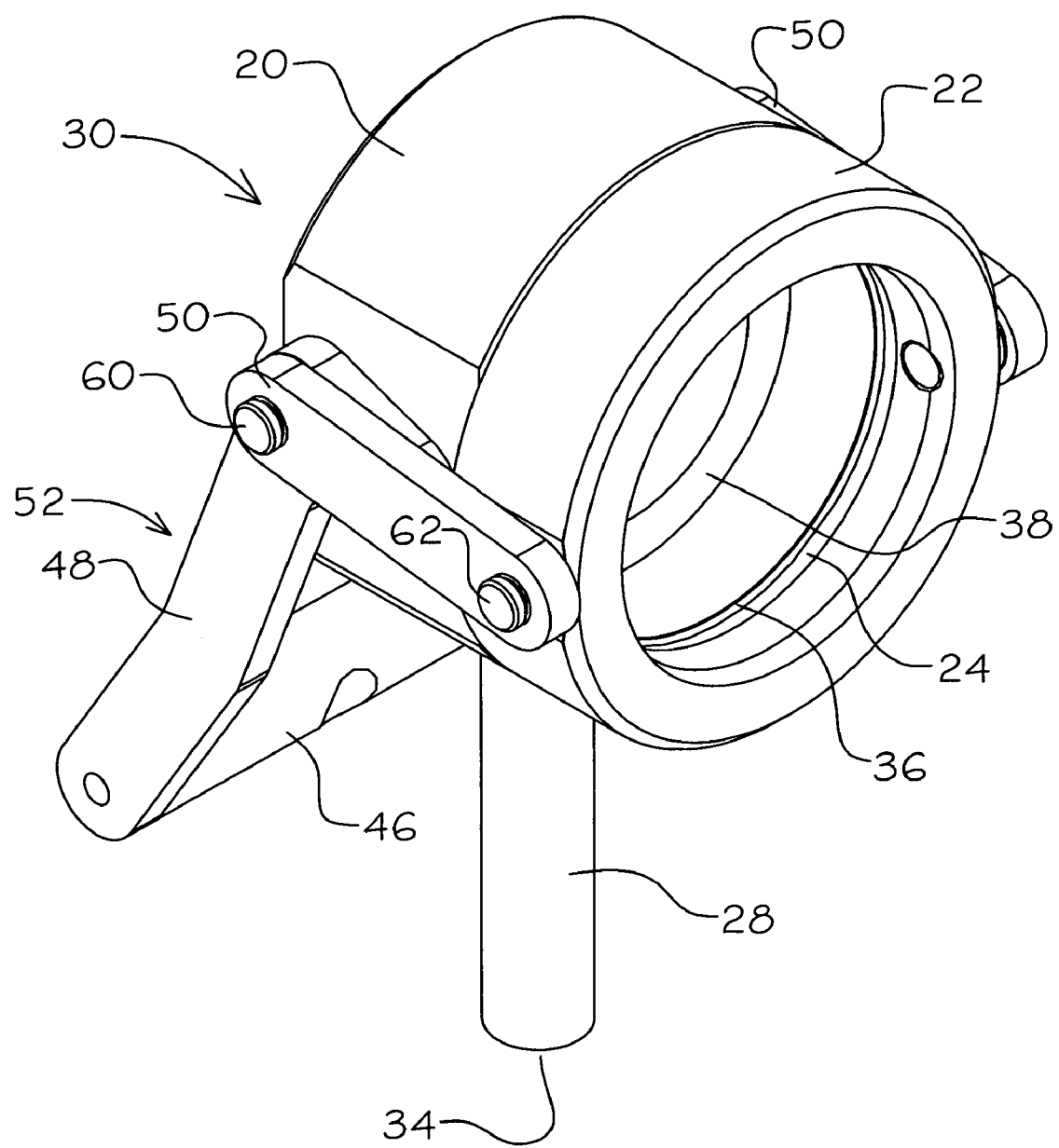
FIG. 4 is a perspective view of the present invention.

Looking at FIG. 4, the perspective illustration of the purge adaptor assembly (30) more clearly illustrates the purge adaptor assembly (30) and the compression lever assembly (52) attached thereto. The handle (46) connecting the levers (48) on both sides of the purge adaptor assembly (30) can also be clearly seen.

Figure 5:
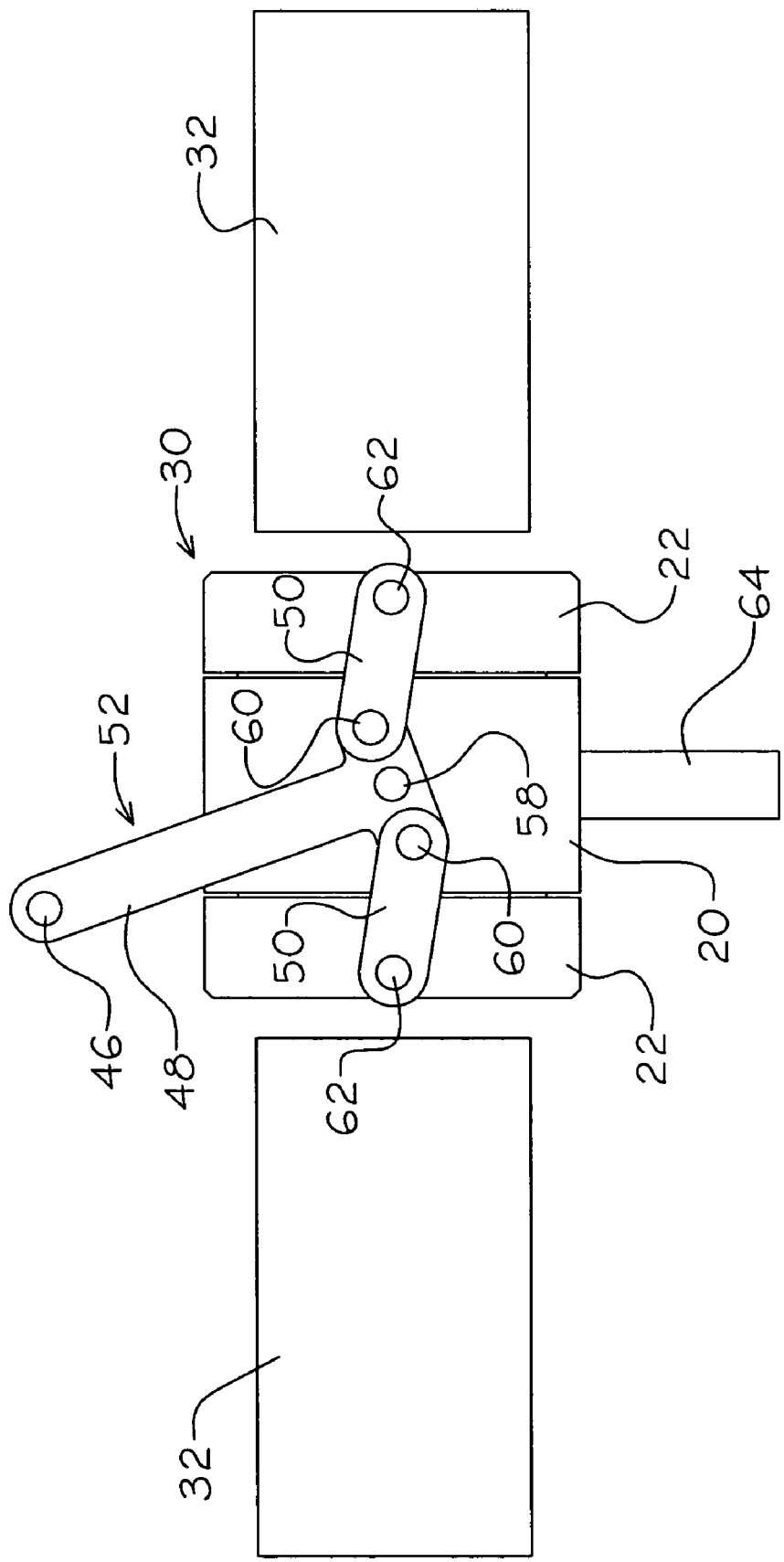
FIG. 5 is a side view of the alternate embodiment of the present invention in the open position and the tubular component not inserted.

An alternate embodiment is illustrated in FIG. 5. Each end of the purge adaptor assembly (30), in a manner similar to the preferred embodiment, has a tube engagement ring (22), an o-ring (24), and a tube locator shelf (38). Two separate tubular components (32) can be inserted on opposing sides of the purge adaptor assembly (30), each being sealed in placed with an o-ring (24) as the tube engagement rings (22) are simultaneously drawn towards the tube engagement base (20) by the action of the compression lever assembly (52). An orifice is formed through the tube engagement base, allowing for fluid communication from one tubular component (32) to the other. A pressure port (64), or optionally a purge connector (28), can be installed in the tube engagement base (20).

While the present invention has been described with regards to particular embodiments, it is recognized that additional variations of the present invention may be devised without departing from the inventive concept.

Having thus described the invention, it is now claimed:

1. A purge injection system for orbital tube welding comprising:
   a breech having a bore formed partially through, said breech having an open end with a front annular bevel sloping inwardly towards a central axis of said breech;
   a ring having a back annular bevel sloping inwardly towards a central axis of said ring, said breech receives said ring, said front annular bevel divergently opposing said back annular bevel forming an annular groove, said ring and said bore being sufficiently large to receive a tube therein, said ring and said bore forming a tube receptacle;
   a purge inlet being formed through said breech and fluidly communicating between a purge source and said bore of said breech;

a coupling means mechanically connecting said breech to said ring and drawing said ring towards said breech in an actuated mode and pushing said ring away from said breech in a disactuated mode, said back annular bevel and said front annular bevel being likewise displaced changing a width of the annular groove;

an o-ring being seated within said annular groove, in said disactuated mode said annular groove being sufficiently sized to permit said o-ring to be completely recessed there within such that no portion of said o-ring protrudes from said annular groove and a tube can be inserted or removed from said tube receptacle, said tube being prevented from contacting said o-ring being protected within said annular groove, in said actuated mode said width is narrowed sufficiently to force said o-ring partially out of said annular groove and partially into said tube receptacle forming a hermetic seal between said o-ring, a wall of said tube and said annular groove;

wherein a purge gas is introduced into said bore through said purge inlet, said purge gas fluidly communicated to an inner volume of said tube throughout an orbital welding process.

2. The purge injection system of claim 1 wherein said coupling means is a lever means.

3. The purge injection system of claim 1 wherein a chamber is formed at a bottom of said bore acting as a tube locator shelf.

4. The purge injection system of claim 1 wherein an inner diameter chamfer is formed on a front face of said ring configured to guide said tube into said tube receptacle.

5. The purge injection system of claim 1 wherein said front annular bevel and said back annular bevel diverge one from the other approaching a central axis of said tube receptacle.

6. The purge injection system of claim 1 wherein said o-ring is replaced with a compression packing seal.

7. The purge injection system of claim 1 wherein said o-ring is replaced with a sealing sleeve.

* * * * *